April 28, 1964 N. M. BARLOW 3,130,464
SEPARABLE PLASTIC SNAP FASTENER
Filed July 10, 1961
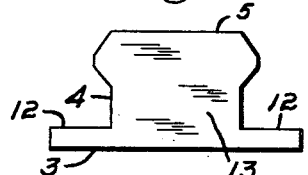
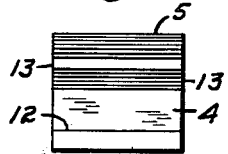
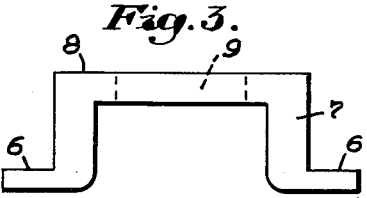
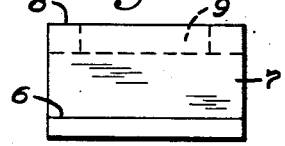
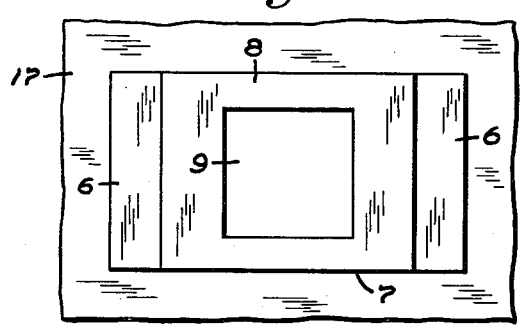
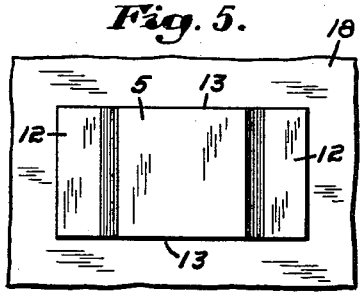
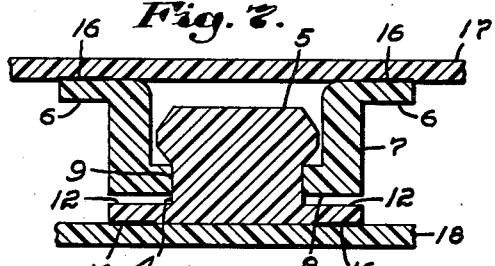
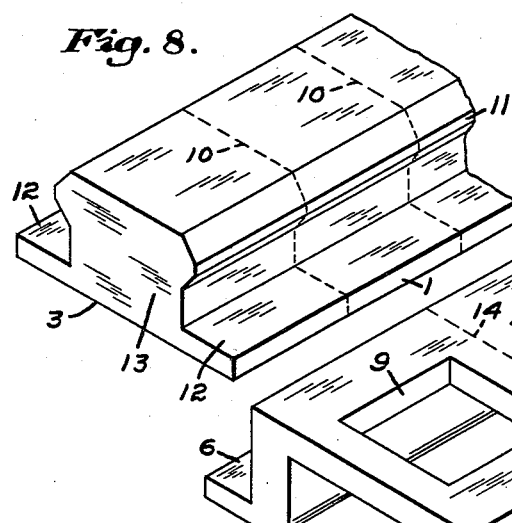
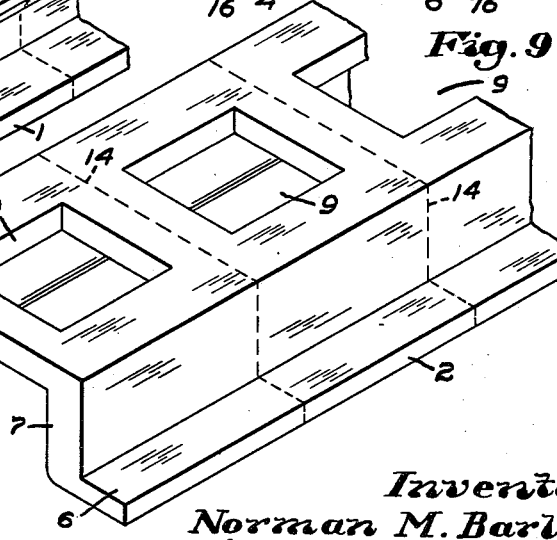
Inventor:
Norman M. Barlow,
by Walter P. Jones
Atty.

United States Patent Office 3,130,464
Patented Apr. 28, 1964

3,130,464
SEPARABLE PLASTIC SNAP FASTENER
Norman M. Barlow, Natick, Mass., assignor to United-Carr Fastener Corporation, Cambridge, Mass., a corporation of Delaware
Filed July 10, 1961, Ser. No. 123,043
1 Claim. (Cl. 24—208)

This invention aims to provide improvements in separable snap fasteners, preferably formed from extruded plastic strips and also preferably adapted to be heat sealed to any suitable article of commerce upon which a snap fastener is desired.

An object of the invention is to provide a snap fastener stud strip which is extruded from suitable plastic material particularly adapted to be heat sealed to a support.

Another object of the invention is to provide a snap fastener socket strip from suitable extruded plastic material preferably adapted to be heat sealed to a support.

Another object of the invention is to provide male and female snap fastener members from the above mentioned stud and socket strips by severing portions from the strips and in the case of the socket, also forming a stud receiving aperture therein.

In the drawings which illustrate preferred forms of my invention:

FIG. 1 is an end view of a snap fastener stud as viewed from a flat side;

FIG. 2 is an elevational view of the stud shown in FIG. 1 as viewed from the right of FIG. 1;

FIG. 3 is an edge view of a socket as viewed from the flat side;

FIG. 4 is a side elevation of the socket shown in FIG. 3;

FIG. 5 is a plan view of the stud member shown in FIG. 1 as attached to a support material;

FIG. 6 is a plan view of the socket shown in FIG. 3 as attached to a support material;

FIG. 7 is a section of the combination of FIG. 5 and FIG. 6 showing a complete installation of stud and socket and supporting materials;

FIG. 8 is an isometric view of a plastic strip from which the snap fastener studs are formed; and FIG. 9 is an isometric view of a plastic strip from which the sockets are made, the stud receiving apertures having been punched in the top face wall.

It is known that snap fasteners formed from heat sealable plastic are now prior art to this invention. The present invention, however, has resulted from a desire to provide inexpensive snap fasteners of simple construction that may be readily heat sealed to desired supporting structures. To this end, the stud members are formed from extruded molded strips 1 as shown in FIG. 8; and the socket members are formed from injection molded strips 2 as shown in FIG. 9.

The stud member is sliced or otherwise severed from the strip 1 and has a base portion 3 from which extend a neck 4 and a head 5 as shown in FIG. 1.

The socket is generally U-shaped in cross section and has a base provided by two opposite flanges 6—6 and a hollow extension 7 having an upper end face wall 8 provided with a stud receiving aperture 9, as shown in FIG. 3.

With reference to FIG. 8, it will be obvious, to anyone skilled in the art, that the extruded plastic strip may be of any suitable shape and dimensioned to provide a construction that will lend itself to being sliced or severed crosswise (as indicated by dotted lines 10) to provide the snap fastener stud members. The head portion 5 and neck portion 4 of the stud are provided by the continuous ridge 11 so that, when the strip is sliced to provide a stud, the head and neck portions oppose each other and are on the same sides of the stud as the flanges 12 thereby leaving flat surfaces 13 on opposite sides of the stud in line with the edges of the base 3.

In FIG. 9 the extruded strip 2, from which the sockets are formed, is indicated as generally U-shaped in cross section, and this strip may be sliced or severed as indicated by dotted lines 14 to provide the snap fastener socket members. When this strip 2 is severed, the socket has two opposed flanges 6, and the stud receiving apertures 9 may be formed, either in the strip before the sockets are severed therefrom, or after severing, as desired.

A complete assembly of the invention is illustrated in cross section by FIG. 7, and heavy lines 16 are shown between the flanges of the stud and the flanges of the socket and their respective supporting materials 17 and 18 to illustrate the manner in which the stud and socket may be heat sealed to their respective supporting materials.

It will be apparent that the invention has definite advantages over individually molded plastic snap fastener studs and sockets because, by providing them from extruded strips, they can be made much more rapidly and less expensively. If it is desired to attach the sockets and/or the studs as individuals as by feeding them from hoppers of attaching machines, the strips may be sliced or severed at any desired time after forming. On the other hand, the invention has definite advantages since the stud providing strip may be rolled into coils and placed in heat sealing attaching machines and severed automatically to provide stud members one at a time for heat sealing attachment, as will be understood by anyone skilled in the art. The socket strip may also be coiled and fed in a heat sealing attaching machine and severed and attached one at a time as a part of the operation. The stud receiving apertures of the sockets may be formed before coiling the strip, or they may be punched in the strip as a part of the operation of the attaching machine.

Since the studs and sockets illustrated are of such formation that they must be orientated relative to each other on their respective support members 17 and 18, this may be more easily accomplished by forming the studs and the sockets from the strips as parts of the attaching machine's operations.

While it is preferred that the socket be the yielding member and the stud the rigid member, it is contemplated that the reverse may be desired under certain circumstances. It is also contemplated that both members might yield. Therefore, each strip may be made from a different formulation of plastic material to secure the desired result, or both strips, under some circumstances, may be made from the same type of plastic material.

While particular shaped stud and socket strips, resulting in given shapes to the studs and the sockets have been illustrated and described, it should be understood that other shapes and sizes may be just as satisfactory, and, in some cases, more desirable. The invention or inventions are not limited by the description and disclosure but are best defined by the following claim.

I claim:

A separable snap fastener comprising a male stud member and a female socket member, each having a different external configuration, of an extruded plastic material, and at least one of which is yieldable, said male stud member having a head and a neck extending from a base, said head and neck being formed by shoulders on opposed sides only, and the said female socket member having a base and a hollow extension of said base having an upper end face wall provided with an aperture for passing the head of a stud into the hollow extension, and said hollow extension being open at opposed sides, said stud passing aperture surrounded by a stud engaging wall to hold the male and female members in snapped engagement.

References Cited in the file of this patent

UNITED STATES PATENTS

| | | |
|---|---|---|
| 1,234,256 | AuBuchon | July 24, 1917 |
| 1,341,600 | Smith | May 25, 1920 |
| 1,648,062 | Russell | Nov. 8, 1927 |
| 1,743,943 | Wagner | Jan. 14, 1930 |
| 2,074,272 | Pugniet | Mar. 16, 1937 |
| 2,585,438 | Clingman | Feb. 12, 1952 |
| 2,709,290 | Rosenthal | May 31, 1955 |
| 2,733,067 | Moore et al. | Jan. 31, 1956 |
| 2,745,159 | Jones | May 15, 1956 |
| 2,940,149 | O'Connor | June 14, 1960 |

FOREIGN PATENTS

| | | |
|---|---|---|
| 896,043 | France | Apr. 17, 1944 |